Figure 1:
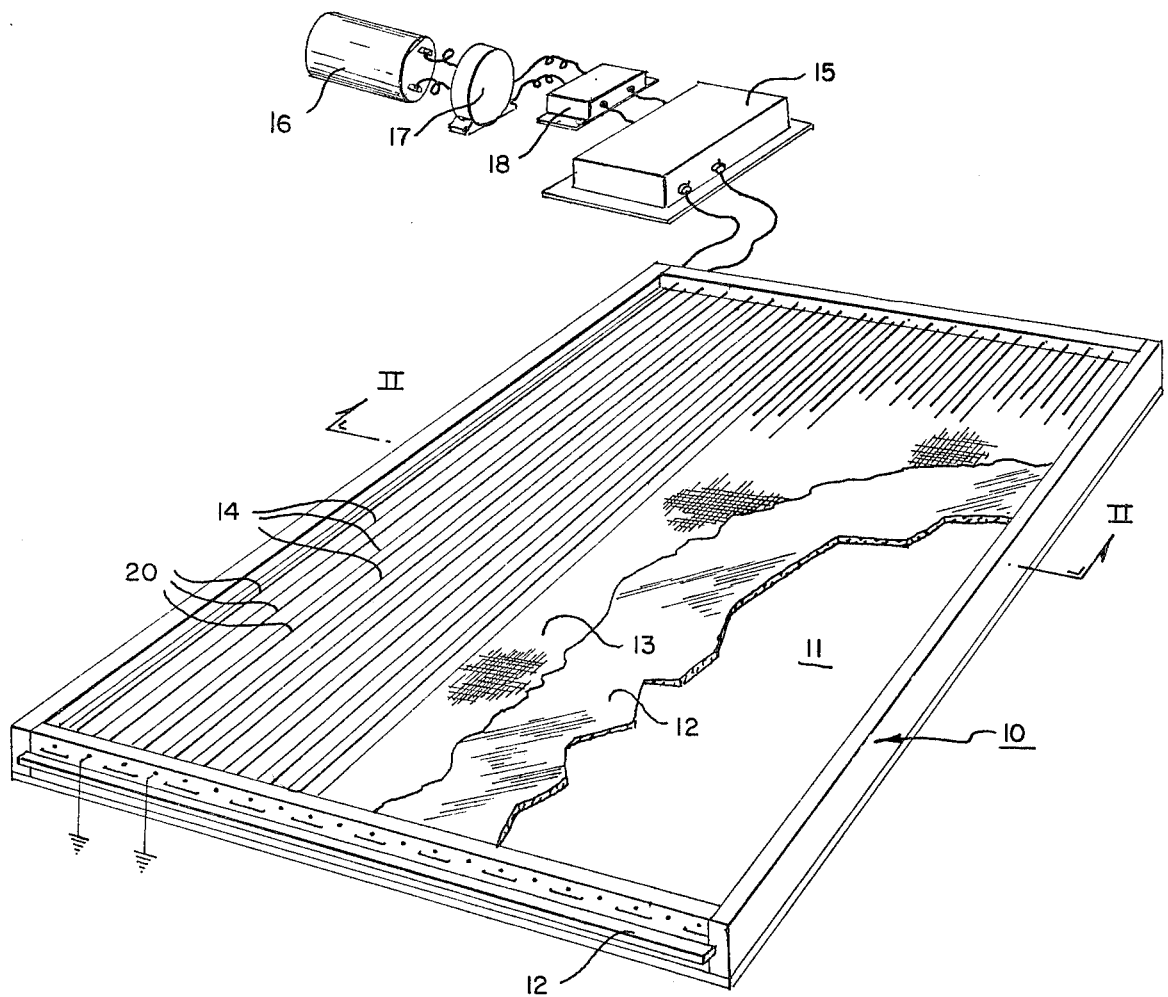

United States Patent [19]

Vick et al.

[11] 4,254,519

[45] Mar. 10, 1981

[54] METHODS AND APPARATUS FOR COLLECTING BEE VENOM

[76] Inventors: James A. Vick, 3913 Linda La., Annandale, Va. 22003; Charles S. Castner, 213 Revere Blvd., Lincoln Park, Reading, Pa. 19609

[21] Appl. No.: 68,946

[22] Filed: Aug. 23, 1979

[51] Int. Cl.³ .............................................. A01K 55/00
[52] U.S. Cl. ..................................................... 6/12 R
[58] Field of Search .............................. 6/12 R, 12 M

[56] References Cited

U.S. PATENT DOCUMENTS 3,163,871   1/1965   Palmer ................................... 6/12 R Primary Examiner—Hugh R. Chamblee
Attorney, Agent, or Firm—Buell, Blenko, Ziesenheim & Beck

[57] ABSTRACT

A method and apparatus are provided for collecting bee venom by inducing a bee to sting a fabric covered glass plate in which the fabric is a finely woven material having a surface generally impermeable to a bee stinger and the barbs associated therewith, drying the venom and removing the venom from said plate.

5 Claims, 2 Drawing Figures

METHODS AND APPARATUS FOR COLLECTING BEE VENOM

This invention relates to methods and apparatus for collecting bee venom and particularly to a method and apparatus for collecting venom of the honey bee (Apis mellifera) without injuring the bee.

Bee venom has been widely used medicinally in Europe for several decades, especially for treatment of rheumatic diseases. Both live bees and extracted venom have been used for these purposes. Bee venom has not been widely used in the United States, at least in part because it has never been available in sufficient quantity for analysis and clinical testing. In fact, because of lack of knowledge of the chemistry of bee venom, its use has been frowned upon except for purposes of desensitization. The desensitization of some persons adversely affected by stinging insects has been accomplished through the use of extracts of whole insects. These extracts are used in part because venom has not been available in adequate quantity.

The problem of collecting bee venom is an old problem which has for years defied attempts at a simple solution. The holder techniques generally resulted in the death of the bee as a result of losing its stinger in the collecting apparatus. One of the early techniques was to catch bees returning to their hive between two revolving cylinders where they were shocked with electricity and squeezed between the rolls to make them sting. Unfortunately in the process many of the bees were crushed and the venom contaminated. In other cases the bees are caused to sting into a plastic or rubber dam. Here the bees lose their stingers in the dam and as a result are killed. In addition the protruding stingers made it difficult to scrape off and recover the venom.

One of the problems involved in recovery of bee venom is the nature of the stinger of the honey bee. The stylet (shaft) of the stinger is about 2 mm. long, sharp at the tip and widening to about 0.1 mm. in diameter. There are several barbs on the stylet, some as long as 0.03 mm. it is these barbs which hold the stinger in the body of an object that has been stung and which usually cause the honey bee to lose its sting and its life. In the process of stinging, the shaft normally becomes embedded for about half its length.

The present method and apparatus are used in connection with the bee hive. The apparatus fits under the brood chamber of a colony of bees and may be moved from hive to hive.

This invention preferably provides a wooden frame defining a flat area over which conductor wires are stretched. Alternate wires are electrically charged and the others are grounded. The circuit between adjacent wires is completed when a bee comes into contact with any two adjacent wires. A glass plate covered with nylon parchment taffeta is placed beneath the wires with the nylon taffeta in contact with the wires. The wires are charged at cyclic intervals, preferably three minutes out of each seven minutes, preferably from a 12 volt d.c. wet battery through a converter which converts 12 volt d.c. to 115 volt a.c. current and then to a variable transformer connected to the wires. The wooden frame is placed in the bottom of the brood chamber and the wires charged with 30 to 35 volts through the variable transformer for a selected period of time. The frame is removed with the glass plate and nylon taffeta and the bee venom recovered from the plate and taffeta. This may be done by scraping with a razor blade or the like.

Figure 2:
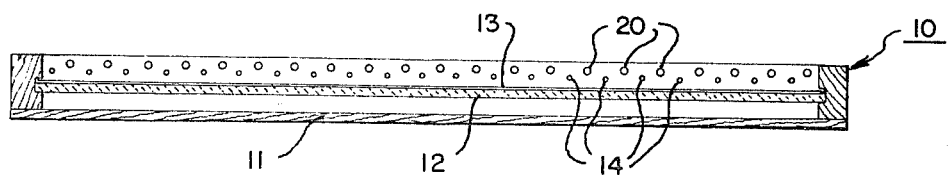

In the foregoing general description, certain objects, purposes, and advantages of this invention have been set out. Other objects, purposes, and advantages of the invention will be apparent from a consideration of the following description and accompanying drawing in which:

FIG. 1 is an isometric view of an apparatus for collecting bee venom according to this invention; and FIG. 2 is a section on the line II—II of FIG. 1.

Referring to the drawings there is illustrated a rectangular frame 10 adapted to fit within a Langstroth bottom board of a bee hive. A plywood base 11 is fixed to the frame 10 and carries a glass sheet 12 over which is stretched a sheet of nylon taffeta parchment 13. Electrical wires 14 extend across the taffeta 13 from one wall of the frame 10 to a point adjacent the opposite wall. The wires 14 are connected to a variable transformer 15 which is in turn connected to a battery 16 through a timer 17, and a converter 18 which converts the direct current from battery 16 into alternating currents of higher voltage. Wires 20 extend across taffeta 13 from the opposite wall of the frame between wires 14. The wires 20 are grounded. Wires 14 are cyclically charged by operating timer 17 to connect the wires 14 to the converter at spaced time intervals, e.g. three minutes on, four minutes off. The unit is installed in each hive for a period of about five minutes during which bees must pass over the wires. Each time a bee contacts two adjacent wires 14 and 20 with the current on, at about 33 volts preferably, the bee is shocked causing it to sting the taffeta and discharge venom onto the glass plate. The plate and taffeta are removed at the end of a given period and the dried venom removed and collected.

Nylon taffeta parchment has been selected as the preferred covering for the glass plate because the bees' stingers do not pierce the individual strands but rather pass through holes between the strands and thus the stingers are generally not lost and the bees are not injured. Other parchment materials which have the "slippery" character of nylon and thus do not catch and hold the stinger barbs may be used, e.g., other synthetic resin fabrics.

In the foregoing specification certain preferred embodiments and practices of this invention are illustrated and described, however, it will be understood that this invention may be otherwise embodied within the scope of the following claims.

We claim:

1. An apparatus for collecting bee venom comprising a glass plate mounted within a frame work, a fabric removably and directly engaging said glass plate and contained within said frame work, said fabric being formed of finely woven strands which strands have a surface generally impenetrable to a bee stinger and to the barbs associated therewith, whereby said stinger may pass between the strands without catching thereon, a plurality of spaced parallel wires extend across the frame work and in contact with said fabric, said wires being arranged above the fabric opposite the glass plate in alternate pairs of opposite polarity whereby bees coming in contact with any such pair receive an electrical shock.

2. An apparatus as claimed in claim 1 wherein said glass plate is removably mounted on a non-conductive frame carrying the plurality of spaced wires and is supported on a base fixed in said frame.

3. An apparatus as claimed in claim 1 wherein the fabric is nylon.

4. An apparatus as claimed in claim 1 wherein the alternate wires are connected to a source of cyclically timed alternating currents.

5. An apparatus as claimed in claim 4 wherein the source of cyclically timed alternating currents is a battery connected through a converter, a timer and a variable transformer to said alternate wires.

* * * * *